(12) United States Patent
Schmidt et al.

(10) Patent No.: US 11,945,054 B2
(45) Date of Patent: Apr. 2, 2024

(54) METHOD FOR PRODUCING A METAL-CERAMIC SUBSTRATE, SOLDER SYSTEM, AND METAL-CERAMIC SUBSTRATE PRODUCED USING SUCH A METHOD

(71) Applicant: Rogers Germany GmbH, Eschenbach (DE)

(72) Inventors: Karsten Schmidt, Eschenbach (DE); Andreas Meyer, Speichersdorf (DE); Stefan Britting, Schnaittach (DE)

(73) Assignee: ROGERS GERMANY GMBH, Eschenbach (DE)

( * ) Notice: Subject to any disclaimer, the term of this patent is extended or adjusted under 35 U.S.C. 154(b) by 0 days.

(21) Appl. No.: 17/765,610

(22) PCT Filed: Oct. 2, 2020

(86) PCT No.: PCT/EP2020/077636
§ 371 (c)(1),
(2) Date: Mar. 31, 2022

(87) PCT Pub. No.: WO2021/069320
PCT Pub. Date: Apr. 15, 2021

(65) Prior Publication Data
US 2022/0362891 A1 Nov. 17, 2022

(30) Foreign Application Priority Data

Oct. 8, 2019 (DE) ...................... 10 2019 126 954.7

(51) Int. Cl.
*B23K 1/00* (2006.01)
*B23K 35/30* (2006.01)
(Continued)

(52) U.S. Cl.
CPC .......... *B23K 35/302* (2013.01); *B23K 1/0008* (2013.01); *B23K 1/0016* (2013.01);
(Continued)

(58) Field of Classification Search
CPC .......... C04B 2237/55; C04B 2237/706; C04B 2237/708; C04B 2237/72; C04B 37/026;
(Continued)

(56) References Cited

U.S. PATENT DOCUMENTS 6,291,804 B1 * 9/2001 Fujii ..................... H05B 3/143
219/541
6,528,123 B1 3/2003 Cadden et al.
(Continued)

FOREIGN PATENT DOCUMENTS

CN 1152371 A * 6/1997 ........... B23K 1/0016
CN 104718616 A * 6/2015 ........... C04B 35/645
(Continued)

*Primary Examiner* — Kiley S Stoner
(74) *Attorney, Agent, or Firm* — CANTOR COLBURN LLP

(57) ABSTRACT

A method for manufacturing a metal-ceramic substrate (1) includes
providing a ceramic layer (10), a metal layer (20) and a solder layer (30),
coating the ceramic layer (10) and/or the metal layer (20) and/or the solder layer (30) with an active metal layer (40),
arranging the solder layer (30) between the ceramic layer (10) and the metal layer (20) along a stacking direction (S), forming a solder system (35) comprising the solder layer and the active metal layer (40), wherein a solder material of the solder layer (30) is free of a melting point lowering material and
(Continued)

bonding the metal layer (20) to the ceramic layer (10) via the solder system (35) by means of an active solder process.

16 Claims, 5 Drawing Sheets

(51) Int. Cl.
| | |
|---|---|
| B23K 35/34 | (2006.01) |
| B23K 35/36 | (2006.01) |
| B23K 101/38 | (2006.01) |
| B23K 103/00 | (2006.01) |
| B23K 103/08 | (2006.01) |
| B23K 103/16 | (2006.01) |
| B23K 103/18 | (2006.01) |

(52) U.S. Cl.
CPC .......... *B23K 35/3006* (2013.01); *B23K 35/34* (2013.01); *B23K 35/36* (2013.01); *B23K 2101/38* (2018.08); *B23K 2103/08* (2018.08); *B23K 2103/172* (2018.08); *B23K 2103/18* (2018.08); *B23K 2103/52* (2018.08)

(58) Field of Classification Search
CPC ............ C04B 2237/08; C04B 2237/12; C04B 2237/122; C04B 2237/34; C04B 2237/348; C04B 2237/365; C04B 37/023; C04B 2237/52; C04B 2237/066; C04B 2235/6581; C04B 2237/123; C04B 2237/124; C04B 2237/125; C04B 2237/126; C04B 2237/343; C04B 2237/366; C04B 2237/368; C04B 2237/402; C04B 2237/404; C04B 2237/407; C22C 5/06; C22C 5/08; C22C 9/00; C22C 9/02; C23C 18/54; H05K 3/38; H05K 1/0306; H05K 1/11; B23K 1/0016; B23K 1/0008; B23K 35/302; B23K 35/3006; B23K 35/34; B23K 35/36; B23K 2101/36–42; B23K 2103/08; B23K 2103/172; B23K 2103/18; B23K 2103/52
USPC .......................................... 228/122.1–124.7
See application file for complete search history.

(56) References Cited

U.S. PATENT DOCUMENTS

| | | | | |
|---|---|---|---|---|
| 8,069,561 | B2 * | 12/2011 | Schulz-Harder | ......... H05K 3/38 228/123.1 |
| 10,370,303 | B2 | 8/2019 | Noboyuki et al. | |
| 2004/0126612 | A1 * | 7/2004 | Shinkai | ................. C04B 37/026 228/122.1 |
| 2017/0276280 | A1 * | 9/2017 | Kobayashi | .............. F16L 41/02 |
| 2018/0255645 | A1 * | 9/2018 | Ideno | .................. H01L 23/3735 |
| 2019/0099843 | A1 * | 4/2019 | Aoshima | .................. G02B 7/09 |

FOREIGN PATENT DOCUMENTS

| | | | | |
|---|---|---|---|---|
| CN | 103282546 B | * | 2/2016 | .......... B23K 35/001 |
| CN | 108340094 A | * | 7/2018 | ........ B23K 35/3006 |
| CN | 109590918 A | * | 4/2019 | |
| CN | 110734295 A | * | 1/2020 | .......... C04B 37/023 |
| DE | 102015108668 A1 | | 12/2016 | |
| EP | 0153618 A2 | | 9/1985 | |
| EP | 0286335 A1 | | 10/1988 | |
| EP | 0743131 A1 | * | 11/1996 | |
| EP | 0277645 A1 | * | 8/1998 | |
| EP | 0935286 A1 | * | 8/1999 | |
| EP | 1176128 A2 | * | 1/2002 | .......... C04B 37/026 |
| EP | 1202345 A2 | * | 5/2002 | ........ H01L 23/3735 |
| EP | 3041042 A1 | | 7/2016 | |
| EP | 3135653 A1 | | 3/2017 | |
| FR | 2873114 A1 | * | 1/2006 | .......... C04B 37/023 |
| JP | 02012841 A | * | 1/1990 | ............ H01L 24/29 |
| JP | 03037165 A | * | 2/1991 | |
| JP | H02495065 A | | 10/1992 | |
| JP | H08277171 A | * | 10/1996 | |
| JP | H10200219 A | * | 7/1998 | |
| JP | 2000286038 A | * | 10/2000 | .......... B23K 1/0016 |
| JP | 2000323618 A | * | 11/2000 | |
| JP | 2001220256 A | | 8/2001 | |
| JP | 2003212669 A | * | 7/2003 | .......... B23K 1/0008 |
| JP | 2003212670 A | * | 7/2003 | .......... B23K 1/0006 |
| JP | 3690979 B2 | * | 8/2005 | .......... C04B 37/026 |
| JP | WO2008149818 A1 | * | 8/2010 | |
| JP | 2015057847 A | | 3/2015 | |
| JP | 2015209356 A | | 11/2015 | |
| TW | 579587 B | * | 3/2004 | |
| WO | WO-0045987 A1 | * | 8/2000 | .......... B23K 1/0012 |
| WO | WO-2005012206 A1 | * | 2/2005 | .......... B23K 35/0244 |
| WO | WO-2013045370 A1 | * | 4/2013 | .......... B23K 1/0006 |
| WO | WO-2015022748 A1 | * | 2/2015 | .......... B23K 1/0016 |
| WO | WO-2016185148 A1 | * | 11/2016 | ............. B23K 26/22 |
| WO | WO-2017213207 A1 | * | 12/2017 | .......... B23K 1/0016 |
| WO | WO-2018006493 A1 | * | 1/2018 | ............. B22F 3/002 |
| WO | WO-2020036452 A1 | * | 2/2020 | .......... C04B 35/581 |

* cited by examiner

METHOD FOR PRODUCING A METAL-CERAMIC SUBSTRATE, SOLDER SYSTEM, AND METAL-CERAMIC SUBSTRATE PRODUCED USING SUCH A METHOD

CROSS-REFERENCE TO RELATED APPLICATIONS

This application is a National Stage filing of PCT/EP2020/077636, filed Oct. 2, 2020, which claims priority to DE 10 2019 126 954.7, filed Oct. 8, 2019, both of which are incorporated by reference in their entirety herein.

BACKGROUND

The present invention relates to a method for manufacturing a metal-ceramic substrate, a solder system for such a method, and a metal-ceramic substrate realized by such a method.

Metal-ceramic substrates are well known from the prior art, for example as printed circuit boards or circuit boards, for example from DE 10 2013 104 739 A1, DE 19 927 046 B4 and DE 10 2009 033 029 A1. Typically, connection regions for electrical components and conductor tracks are arranged on one component side of the metal-ceramic substrate, wherein the electrical components and the conductor tracks can be interconnected to form electrical circuits. Essential components of the metal-ceramic substrates are an insulating layer, which is preferably made of a ceramic, and at least one metal layer bonded to the insulating layer. Due to their comparatively high insulation strengths, insulation layers made of ceramics have proven to be particularly advantageous in power electronics. By structuring the metal layer, conductive tracks and/or connection regions for the electrical components can then be realized.

Requirement for providing such a metal-ceramic substrate is a permanent bond between the metal layer and the ceramic layer. In addition to a so-called direct bonding process, i.e. DCB or DAB process, it is known from the prior art to bond the metal layer to the ceramic layer via a solder material.

An active solder process, e.g. for bonding metal layers or metal foils, in particular also copper layers or copper foils, to ceramic material, is to be understood as a process which is used specifically for manufacturing metal-ceramic substrates. In this process, a bond between a metal foil, for example a copper foil, and a ceramic substrate, for example an aluminum nitride ceramic, is produced at a temperature between about 650-1000° C. using a brazing alloy which, in addition to a main component such as copper, silver and/or gold, also contains an active metal. This active metal, which is for example at least one element of the group Hf, Ti, Zr, Nb, Ce, establishes a connection between the brazing alloy and the ceramic by chemical reaction, while the connection between the brazing alloy and the metal is a metallic brazing connection.

EP 3 041 042 A1 and WO 2017/126653 A1 disclose, for example, methods for manufacturing a power module substrate using an active solder material. In particular, it is provided here that a bonding of a copper foil to a ceramic layer is carried out via a multilayer solder system. This multilayer system is composed of a layer of a titanium foil and a layer of a phosphorus-containing solder filler material.

SUMMARY

Considering this prior art, the present invention makes it its task to realize a bonding of the metal layer to the ceramic layer using a solder system that is improved compared to the prior art, in particular with respect to the solder layer, bonding the metal layer and the ceramic layer, and the bonding process during active soldering.

This task is solved by a method for manufacturing a metal-ceramic substrate as described herein, a solder system for such a method according to claim 14 and a metal-ceramic substrate manufactured by such a method as described herein. Further advantages and properties result from the claims and dependent claims as well as from the description and the included figures.

BRIEF DESCRIPTION OF THE FIGURES

Further advantages and features result from the following description of embodiments with reference to the attached figures. Individual features of the individual embodiment can thereby be combined with each other within the scope of the invention, which show, in.

DETAILED DESCRIPTION

Figure 1:
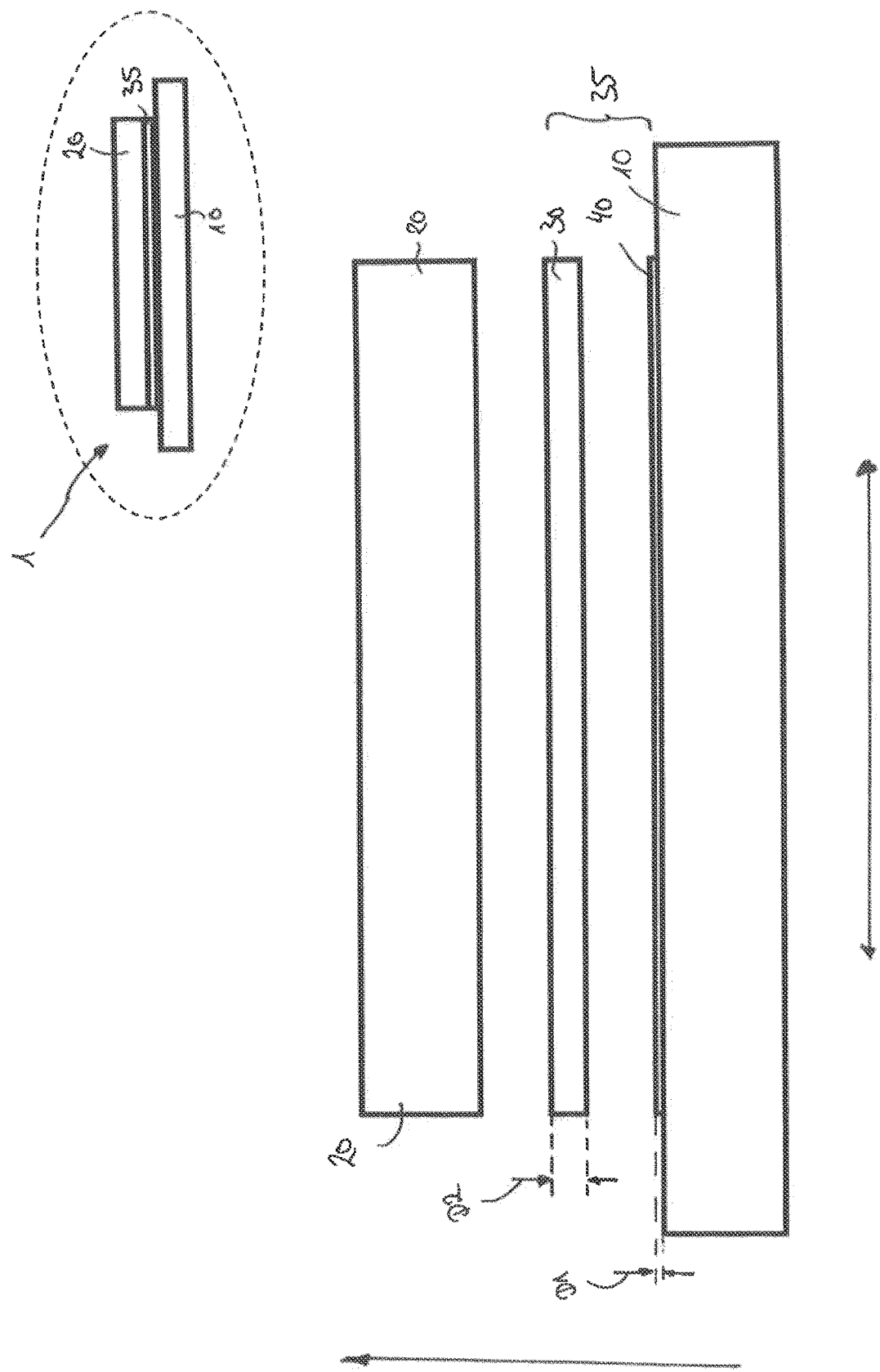
FIG. 1: Schematic of a method for manufacturing a metal-ceramic substrate according to a first preferred embodiment of the present invention.

According to a first aspect of the present invention, a method for manufacturing a metal-ceramic substrate is provided, comprising:

providing at least one ceramic layer, at least one metal layer and at least one solder layer, in particular in the form of at least one solder foil, coating the at least one ceramic layer and/or the at least one metal layer and/or the at least one solder layer with at least one active metal layer, arranging the at least one solder layer between the at least one ceramic layer and the at least one metal layer along a stacking direction, forming a solder system comprising the at least one solder layer and the at least one active metal layer, and bonding the at least one metal layer to the at least one ceramic layer via the solder system by means of an active solder process.

Compared with the processes known from the prior art for manufacturing metal-ceramic substrates, a multilayer solder system comprising at least one solder layer, preferably free of melting point-lowering elements, and at least one active metal layer is provided in accordance with the invention. The separation of the at least one active metal layer and the at least one solder layer proves to be advantageous in particular because comparatively thin solder layers can thus be realized, especially if the solder layer is a foil. Otherwise, comparatively large solder layer thicknesses must be realized for solder materials comprising active metals because of the brittle intermetallic phases, which hinder the transformation of the solder paste or solder layer, whereby the minimum layer thickness is limited by the manufacturing properties of the solder material comprising active metals. Accordingly, for active metal-containing solder layers, it is not the minimum thickness required for the joining process that determines the minimum solder layer thickness of the solder layer, but rather the minimum layer thickness of the solder layer that is technically feasible that determines the minimum solder layer thickness of the solder layer. As a result, this thicker solder layer containing active metal is more expensive than thin layers.

By separating the active metal from the at least one solder layer, the solder layer thickness of the at least one solder layer can be reduced in an advantageous manner. As a result, material for the solder system or for the at least one solder layer can be saved. It turned out to be particularly advantageous that such active-metal-free solder layers can also be rolled down to thicknesses of less than 10 µm, preferably less than 7 µm. A further advantage is that the etching of the patterning on the manufactured metal-ceramic substrate is simplified, in particular because a second thickness of the solder system or of the at least one solder layer is reduced. In addition, the bonding of the metal layer to the ceramic layer can be accelerated in the manufacturing process.

In particular, it turned out that the use of a separate active metal layer is also possible if the solder layer is free of melting point-lowering elements and/or phosphorus-free. This gives greater flexibility in the choice of the material for the at least one solder layer to be used in each case, and the established process parameters for the active solder process can be used. In addition, it is advantageously possible to avoid the addition of corresponding melting point-lowering elements prior to the formation of the at least one solder layer. In particular, the skilled person understands by an at least one solder layer, which is free of melting point-lowering elements, a layer which has less than 3% by weight, preferably less than 2% by weight and more preferably less than 1% by weight of these melting point-lowering elements. Examples of these melting point lowering elements are phosphorus and zinc. The use of phosphorus-free soldering materials permits, for example, the advantageous separation of active metal layer and soldering layers also for those soldering layers which are free of phosphorus but comprise a melting point-lowering material whose integration into the soldering layer in turn does not lead to such a significant lowering of the melting point as is known for phosphorus. For example, it is such a melting point lowering material which lowers the melting point of the solder layer by less than 100° C., preferably less than 80° C. and more preferably less than 50° C.

Furthermore, it is preferably provided that the at least one solder layer is free of an active metal. In particular, the skilled person understands free of active metal to mean that the solder layer has less than 5% by weight, preferably less than 3% by weight and more preferably less than 1.5% by weight of active metal. Examples of an active metal are titanium (Ti), zirconium (Zr), hafnium (Hf), chromium (Cr), niobium (Nb), cerium (Ce) and vanadium (V). It is particularly preferred that the at least one solder layer is provided as a foil. This permits the simplest possible handling of the foil when arranging it between the at least one ceramic layer and the at least one metal layer, in particular in serial production of metal-ceramic substrates.

For example, it is also conceivable that the at least one solder layer is already provided together with a metal layer or the at least one metal layer. E.g., the at least one solder layer is provided on a side of at least one metal layer that is used to manufacture the metal-ceramic substrate. In this case, the at least one metal layer serves as a support for the at least one solder layer. However, it is also conceivable that the at least one solder layer is provided on a film, for example on a plastic film forming the support. Furthermore, it is conceivable that the at least one solder layer is provided on the at least one metal layer and that the at least one further metal layer, preferably with a different grain size distribution or a different average grain size, is provided on the side of the at least one metal layer facing away from the solder layer, which preferably carries the at least one solder layer. In particular, it is provided that the grain sizes, in particular their average grain sizes, of the at least one metal layer and of the at least one further metal layer differ from one another, so that a two-layer metallization layer is formed on the upper side of the ceramic during the bonding process. It is particularly preferred that the metal layer with the smaller average grain size is located on the outside and the metal layer with the larger average grain size faces the solder system or the ceramic layer.

In particular, it turned out to be advantageous that the at least one active metal layer can optionally be applied to the at least one ceramic layer and/or the at least one metal layer and/or the at least one solder layer. Preferably, the at least one active metal layer is applied to at least two of said layers. Preferably, the at least one active metal layer is arranged on the at least one ceramic layer and/or on at least one metal layer on that side which, in the arranged state or in the metal-ceramic substrate, faces the at least one solder layer. It is particularly preferred that the at least one active metal layer is applied to the at least one solder layer. In this case, a solder system comprising the at least one solder layer with the at least one active metal layer can be provided, which can be easily arranged between the at least one ceramic layer and the at least one metal layer for the active solder process. In this case, the bonding process is an active solder process carried out at a process temperature between 600° C. and 1000° C., preferably between 700° C. and 950° C.

Preferably, the solder material of the at least one solder layer is a silver-based or a copper-based solder material. In a silver-based solder material, silver is the main component, i.e. the constituent with the highest proportion in terms of weight percentage, while in a copper-based solder material copper is the main component. Examples of a silver-based solder material are AgCu, in particular AgCu28, AgCuIn, AgCuSn and AgCuGa. Examples of a copper-based solder material are copper CuSn, CuIn, CuGa, CuInSn, CuIn Mn, CuGaSn. It is also conceivable to use NiCrMn as the solder material. In particular, it is preferably provided if the solder layer is silver-free, i.e. the solder layer comprises less than 3% by weight of silver, preferably less than 2% by weight of silver and more preferably less than 1% by weight of silver. In this way, silver can be saved in an advantageous manner, as the silver content of the manufactured metal-ceramic substrate can otherwise lead to silver migration in the solder system.

Preferably, the solder layer or the solder material of the solder layer comprises several components and/or is silver-free. In other words, the solder material does not consist of a single chemical element. In particular, it is provided that the solder layer does not exclusively consist of silver. Preferably, it is provided that the solder layer comprises at least two different components or constituents. This makes it advantageously possible to further optimize the bonding behaviour, for example with regard to adhesion strength and thermal shock resistance. For example, one is not forced to use a pure silver layer, whose silver migration and etching behavior have a detrimental effect on the fabricated metal-ceramic substrate. Other examples of materials that form the solder layer as a brazing material are: CuNi and CuNiMn, in particular up to a working temperature of the solder of 1050° C. Furthermore, pure silver is conceivable.

Conceivable materials for the at least one metal layer are copper, aluminum, molybdenum and/or alloys thereof, as well as laminates and powder-metallurgical compound materials such as CuW, CuMo, CuAl, AlCu and/or CuCu, in particular a copper sandwich structure with a first copper layer and a second copper layer, wherein a grain size in the first copper layer differs from a second copper layer. Furthermore, it is preferably provided that the at least one metal layer is surface modified. A conceivable surface modification is, for example, sealing with a noble metal, in particular silver and/or gold, or ENIG ("electroless nickel immersion gold") or edge encapsulation of the first or second metallization layer to suppress crack formation or expansion.

Preferably, the at least one ceramic layer comprises $Al_2O_3$, $Si_3Na$, AlN, an HPSX ceramic (i.e. a ceramic with an $Al_2O_3$ matrix comprising an x-percent amount of $ZrO_2$, for example $Al_2O_3$ with 9% $ZrO_2$=HPS9 or $Al_2O_3$ with 25% $ZrO_2$=HPS25), SiC, BeO, MgO, high-density MgO (>90% of the theoretical density), TSZ (tetragonally stabilized zirconium oxide) or ZTA as material for the ceramic. In this context, it is also conceivable that the insulating layer is designed as a composite or hybrid ceramic, in which, in order to combine various desired properties, several ceramic layers, each differing in terms of their material composition, are arranged on top of one another and joined together to form an insulating layer. Preferably, a highly thermally conductive ceramic is used for the lowest possible thermal resistance.

According to a preferred embodiment, it is provided that the at least one active metal layer is applied by means of a vapor deposition process, in particular a physical vapor deposition process (PVD), or by means of chemical vapor deposition (CVD). By means of this manufacturing process, it is possible to provide comparably thin active metal layers which, in particular, are applied as homogeneously as possible. In particular, the application can be as controlled as much as possible, so that the applied at least one active metal layer has a thickness as constant as possible over the application area. For example, vapor deposition processes can be used such as: thermal evaporation, electron beam evaporation, laser beam evaporation, arc evaporation or molecular beam epitaxy, a sputtering such as an ion beam assisted deposition, an ion plating and/or an ICB technique.

Advantageously, a first thickness of the at least one active metal layer has a value between 100 nm and 1000 nm, preferably between 150 nm and 750 nm and more preferably between 200 nm and 500 nm. Such thin active metal layers advantageously prevent the reduction of the thermal conductivity and the reduction of the mechanical strength of the metal-ceramic substrate, in particular at the interface between the at least one ceramic layer and the at least one metal layer. More preferably, the layer thickness is matched with the expected storage time. For example, for long storage times, for example of more than 10 days, in particular for titanium as an active metal layer, it turned out to be advantageous to use a layer thickness between 750 and 1000 nm. For shorter storage times, it is possible to use a first thickness of 150 nm to 350 nm.

Preferably, the active solder process is performed at a pressure of less than $10^{-2}$ mbar, preferably less than $10^{-3}$ and more preferably less than $10^{-4}$ and/or using process gas. For example, the active solder process is performed in a high vacuum or in a fine vacuum with very low oxygen and argon partial pressure of less than 1 mbar. Alternatively, it is also conceivable to work at an atmospheric pressure under argon or generally a noble gas. Since no organic binders are used here, it is possible to reduce the process time by up to half.

Furthermore, it is preferably provided that a second thickness of the at least one solder layer has a value between 1 and 100 μm, preferably between 1.5 and 50 μm and more preferably between 2 and 20 μm or even less than 10 μm. In particular, this is the second thickness before the bonding process, i.e. the active solder process. It is particularly preferred that the at least one solder layer is further reduced before the bonding process, for example by rolling to a thickness of less than 10 μm, preferably to a thickness of less than 7 μm and more preferably to a thickness of less than 5 μm. In this way, a layer thickness of the solder material or of the at least one solder layer can be further reduced with advantage. Furthermore, it is preferably provided that the at least one solder layer is reduced in terms of its layer thickness by means of roll cladding before being arranged between the at least one ceramic layer and the at least one metal layer. In this way, a thinner at least one solder layer can be realized before it is reduced in a further solder layer step to the final layer thickness intended for the bonding process—for example by means of rolling.

In particular, it is provided that a ratio of a first thickness of the active metal layer to a second thickness of the solder layer has a value between 0.003 and 0.5, preferably between 0.015 and 0.2, and more preferably between 0.03 and 0.14. In other words, the second thickness of the solder layer is significantly greater than the first thickness of the active metal layer.

Furthermore, it is preferably provided that the at least one active metal layer is covered by at least one protective layer. By means of this at least one protective layer, it is advantageously possible to prevent oxidation of the at least one active metal layer. For example, copper (Cu), nickel (Ni), indium (In), silver (Ag), chromium (Cr) or titanium nitride (TiN) can be used as the protective layer for the at least one active metal layer. In this case, the thickness of the at least one protective layer has a value of at least 100 nm. It is particularly preferred that the thickness of the at least one protective layer, i.e. the third thickness, is adapted to the storage time, i.e. the time that elapses between the application of the at least one active metal layer and the actual bonding process in the active solder process. In this way, the permanent storage of components (being the at least one metal layer and/or the at least one active metal layer and/or the at least one solder layer) covered with at least one active metal layer, can be ensured in an advantageous manner without the at least one active metal layer oxidizing already prior to the bonding process. For example, the layer thickness of the at least one protective layer, i.e. a third thickness, is between 100 nm or 50 nm and 1000 nm, preferably between 150 nm and 750 nm and more preferably between 250 nm and 500 nm thick.

Furthermore, it is preferably provided that a ratio of the third thickness of the at least one protective layer to the first thickness of the at least one active metal layer, measured in the stacking direction, has a value between 0.5 and 1, preferably between 0.7 and 0.9 and more preferably between 0.75 and 0.85.

Furthermore, it is preferably provided that the at least one active metal layer changes its composition along the stacking direction. In this way, an untimely oxidation of the active metal layer can also be prevented in an advantageous manner, in particular by increasing an amount of intercalation elements, such as nitrogen, oxygen or carbon, with increasing distance from the surface to which the active metal has been applied (being the at least one metal layer, the at least one ceramic layer or the at least one solder layer). Furthermore, it is conceivable that in order to extend the storage times of the component provided with the at least one active metal layer or of the component provided with the at least one active metal layer, being the at least one metal layer, the at least one ceramic layer and/or the at least one solder layer, the at least one active metal layer is covered with at least one further solder layer. In this case, a thickness of the at least one further solder layer is thinner than the second thickness of the at least one solder layer by at least a factor of 0.1 preferably 0.05 and more preferably 0.01. Advantageously, the solder system forms a sandwich structure in which the at least one active metal layer is encased or surrounded by the at least one solder layer and the at least one further solder layer.

Preferably, it is provided that the at least one solder layer and/or the at least one active metal layer is rolled, preferably in such a way that a first thickness of the active metal layer after rolling and/or pressing has a value of less than 1000 nm, preferably less than 750 nm and more preferably less than 500 nm. In this way, it is advantageously possible to realize a first thickness of the active metal layer which is in particular less than 1000 nm when the solder layer and the active metal layer are rolled together, compared to an alternative application by means of an electroplating process or a vapour phase deposition process. In this process, the layer thicknesses of the solder layer and the active metal layer, i.e. the first thickness and the second thickness, are jointly rolled down and/or pressed. For this purpose, a solder layer, for example in the form of a thick solder foil, and an active metal layer are first joined together, for example by means of upstream rolling or initial rolling for layer thickness reduction. In this context, it is preferably provided that a starting layer thickness of the active metal layer and a starting layer thickness of the solder foil are in the same ratio to each other as the first thickness and the second thickness in the manufactured solder system comprising the active metal layer with the first thickness and the solder layer with the second thickness. Subsequent rolling, in particular multiple rolling, causes the active metal layer and the solder layer to be rolled down in their respective thicknesses by each rolling to provide a comparatively thin solder layer on which an even thinner active metal layer is disposed. This solder system can then subsequently be used to bond the metal layer to the ceramic layer in an active solder process.

It is particularly preferred that a further active metal layer is provided, the solder layer being arranged between the active metal layer and the further active metal layer. As a result, the interface between the solder layer and the at least one metal layer can also be influenced by the active metal of the active metal layer.

Furthermore, it is preferably provided that the ceramic layer is coated with the active metal layer and the at least one metal layer is coated with the solder layer.

It is particularly preferred if the at least one metal layer has a layer thickness greater than 1 mm, preferably greater than 1.3 mm and especially preferably greater than 1.5 mm. This provides a comparatively thick at least one metal layer, which supports rapid dissipation of thermal energy and already enables heat spreading on the component side.

A further aspect of the present invention is a solder system for a method according to the invention, wherein the solder system comprises at least one solder layer, in particular in the form of a solder foil, and at least one active metal layer. All advantages and specifications described for the method for manufacturing the metal-ceramic substrate apply analogously to the solder system.

Another aspect is a metal-ceramic substrate manufactured by a method comprising:
  providing at least one ceramic layer, at least one metal layer and at least one solder layer, in particular in the form of at least one solder foil,
  coating the at least one ceramic layer and/or the at least one metal layer and/or the at least one solder layer with at least one active metal layer
  arranging the at least one solder layer between the at least one ceramic layer and the at least one metal layer along a stacking direction, forming a solder system comprising the at least one solder layer and the at least one active metal layer, wherein a solder material of the at least one solder layer is preferably free of a melting point lowering material and
  bonding the at least one metal layer to the at least one ceramic layer via the solder system by means of an active solder process. All advantages and features described for the method for manufacturing the metal-ceramic substrate apply analogously to the metal-ceramic substrate.

Further advantages and features result from the following description of preferred embodiments of the subject matter according to the invention with reference to the attached figures. Individual features of the individual embodiments can thereby be combined with one another within the scope of the invention.

FIG. 1 schematically shows a method for manufacturing a metal-ceramic substrate 1 according to a first preferred embodiment of the present invention. Such a metal-ceramic substrate 1 is preferably respectively used as a carrier of electronic or electrical components which can be connected to the metal-ceramic substrate 1. In the upper left corner, an example of a manufactured metal-ceramic substrate 1 is schematically illustrated. Essential components of such a metal-ceramic substrate 1 include at least one ceramic layer 10 extending along a main extension plane HSE, and at least one metal layer 20 bonded to the at least one ceramic layer 10. The at least one ceramic layer 10 is made of at least one material comprising a ceramic. In this case, the at least one metal layer 20 and the at least one ceramic layer 10 are arranged one above the other along a stacking direction S extending perpendicularly to the main extension plane HSE and, in a fabricated state, are joined to one another by a material bond by means of a solder system 35, at least in certain regions. Preferably, the at least one metal layer 20 in the fabricated metal-ceramic substrate 1 is then structured to form conductor tracks or connection regions for the electrical components. For example, this patterning is etched into the at least one metal layer 20. Previously, however, a permanent bond, in particular a material bond, must be established between the at least one metal layer 20 and the at least one ceramic layer 10.

In the embodiment example of FIG. 1, this permanent, in particular materially bonded connection is realized by means of an active solder process. For this purpose, a solder system 35 is arranged between the at least one ceramic layer 10 and the at least one metal layer 20, via which the material bond between the ceramic layer 10 and the metal layer 20 is ensured in the finished metal-ceramic substrate 1. In particular, it is provided that the solder system 35 has a multilayer design. In addition to at least one solder layer 30, the solder system 35 comprises at least one active metal layer 40. In this context, it is provided in particular that the at least one solder layer 30 is free of an active metal, i.e. has no active metal. Instead, the active metal is provided with a separate layer in the solder system 35 as active metal layer 40. Advantageously, it turned out that this separation in the solder system 35, in which an active-metal-free soldering material is provided in the solder layer 30 on one side and an active-metal-surrounding active-metal layer 40 is provided on the other side, makes it possible to achieve a solder layer 30 that is as thin as possible. Otherwise, it would be necessary to accept a greater minimum layer thickness for the at least one solder layer 30, in particular in the form of a solder foil, which is limited by the manufacturing process of the at least one solder layer 30 and not by the minimum thickness required for the joining process.

By separating the at least one active metal layer 40 and the at least one solder layer 30, correspondingly thinner solder foils can be produced because here no brittle intermetallic phases hinders the transformation. In particular, it is thereby advantageously possible to provide solder layers 30 which ensure rollability of the at least one solder layer 30, in particular in the form of the solder foil, to a thickness of less than 10 μm, preferably less than 8 μm and more preferably less than 6 μm. In the illustrated embodiment example, the at least one active metal layer 40 is applied to the at least one ceramic layer 10, for example by means of sputtering or CVD, and has a first thickness D1 which has a value between 100 nm and 1000 nm, preferably between 150 nm and 750 nm and more preferably between 200 nm and 500 nm.

Such thin active metal layers 40 make it possible to prevent a reduction in thermal conductivity and mechanical strength that would otherwise be expected with thicker active metal layers 40. This is particularly true for a layer thickness or first thickness D1 between 200 nm and 500 nm. In this context, it is provided that the at least one solder layer 30, in particular as at least one solder foil, is arranged as a separate layer between the at least one active metal layer 40 and the at least one metal layer 20 before the active solder process is carried out. For example, it is conceivable that the at least one solder foil is applied to the at least one active metal layer 40 and is plated by a rolling step to a second thickness smaller than 10 μm, preferably below 7 μm, in order to ensure the at least one solder layer 30 is as thin as possible. The use of a comparatively thin at least one solder layer 30 accelerates, on the one hand, the bonding process and, on the other hand, advantageously reduces the material consumption in manufacturing the bond between the at least one ceramic layer 10 and the at least one metal layer 20. In this case, the at least one ceramic layer 10 and the at least one metal layer 20 are arranged one above the other along the stacking direction S, the solder system 35 with the at least one solder layer 30 and the at least one active metal layer 40 being arranged along the stacking direction S between the at least one metal layer 20 and the at least one ceramic layer 10. In particular, it is provided that the at least one solder layer 30 is not only free of active metal, but also free of melting point lowering elements, such as phosphorus or zinc. By substantially "free from elements with a low melting point", the skilled person understands in particular that their amount in the solder layer is less than 3% by weight, preferably less than 2% by weight and more preferably less than 1% by weight. By way of example, the at least one solder layer 30 avoids using a solder material containing phosphorus or zinc in order to prevent the melting temperature from being lowered. Surprisingly, it turned out that bonding via the separate at least one active metal layer 40 is also possible for such solder materials in which even no melting point-lowering elements are co-used. This permits the use of comparatively thin at least one solder layers 30 for such solder materials which are used at the usual process temperatures of an active solder process. Correspondingly, the usual process parameters typically used in the active solder process can be used, and a comparatively very thin at least one solder layer 30 can be realized.

Figure 2:
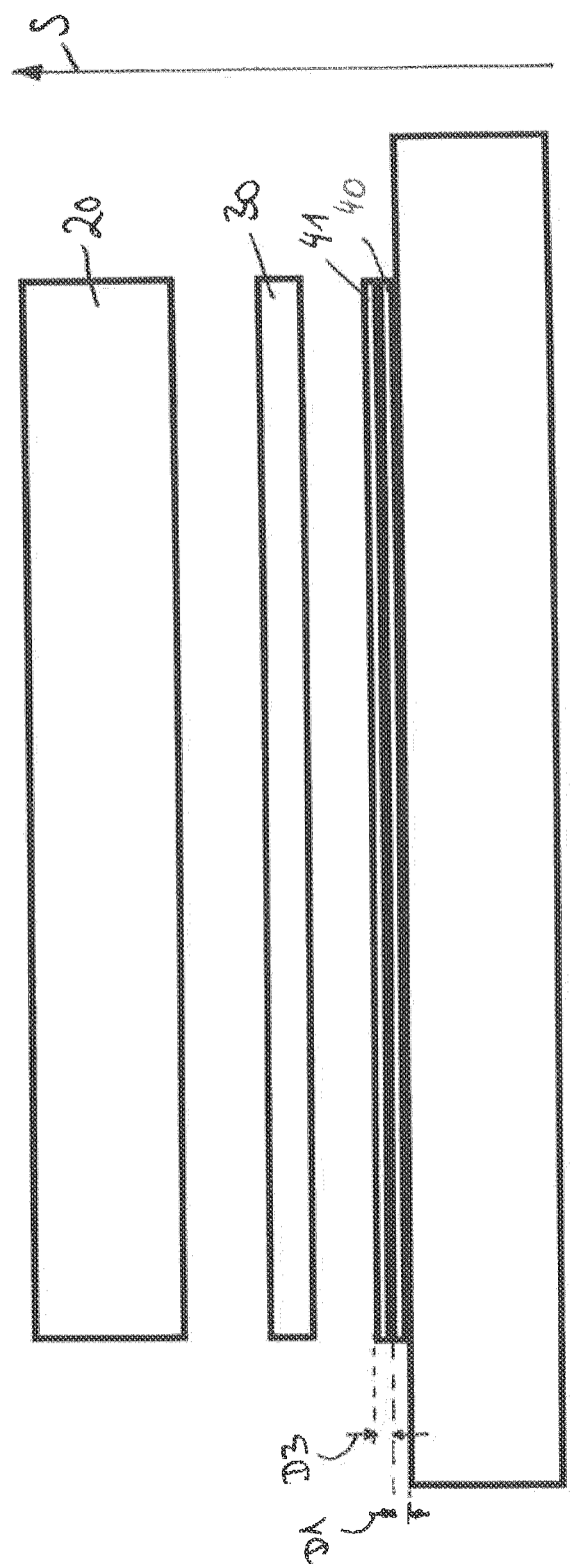
FIG. 2: Schematic of a method for manufacturing a metal-ceramic substrate according to a second preferred embodiment of the present invention.

FIG. 2 schematically illustrates a method for manufacturing a metal-ceramic substrate 1 according to a second exemplary embodiment of the present invention. In particular, the embodiment example of FIG. 2 differs essentially only from the embodiment example of FIG. 1 in that at least one protective layer 41 is provided in addition to the at least one active metal layer 40. In particular, the at least one protective layer 41 extending in the main extension plane HSE covers the active metal layer 40. By using such at least one protective layer 41, it is advantageously possible to prevent oxidation from taking place on the at least one active metal layer 40 or on the outside of the at least one active metal layer 40 before the actual bonding process, i.e. the active solder process, takes place. Preferably, such at least one protective layer 41 has a third thickness D3 having a minimum thickness of at least 100 nm. Preferably, the third thickness D3 of at least one of the protective layers is 100 nm to 1000 nm, preferably 150 nm to 750 nm and more preferably between 200 nm and 500 nm. Furthermore, it is preferably provided that the at least one protective layer 41 partially or preferably completely covers the at least one active element layer 40 and, viewed in stacking direction S, is arranged between the at least one active metal layer 40 and the at least one solder layer 30. Preferably, the third thickness D3 is adapted to the expected duration, starting from the deposition of the active metal layer (40) and the protective layer (41) until the bonding takes place by means of the active solder process. In this way, the intended storage time can be adjusted in an advantageous manner, in particular by the third thickness D3 of the protective layer 41, in order to ensure that the at least one active metal layer 40 does not undergo oxidation before bonding. Preferably, it is provided that the third thickness D3 of the at least one protective layer 41 substantially corresponds to the first thickness D1 of the active metal layer 40.

It is further provided that the at least one solder layer 30 has a second thickness D2 which has a value between 0.1 and 100 μm, preferably between 0.5 and 50 prn and more preferably 0.2 and 20 μm. In particular, this is the second thickness D2 before the application of the at least one solder layer 30 or arranging on the at least one metal layer 20 or on the at least one active metal layer 40. In particular, it is provided that after the application or arranging of the at least one metal layer 20, the second thickness D2 of the at least one solder layer 30 is further reduced by a further rolling. After arranging the at least one metal layer 20, the at least one ceramic layer 10 and the solder system 35, being arranged between the at least one metal layer 20 and the at least one ceramic layer 10, a bonding is carried out using a temperature between 700° C. and 900° C. Preferably, the soldering process takes place at a pressure lower than 10 mbar. It is also conceivable that the bonding process, i.e. the active solder process, is carried out using a process gas, or in a working atmosphere comprising, for example, argon or, more generally, one or more noble gases.

Figure 3:
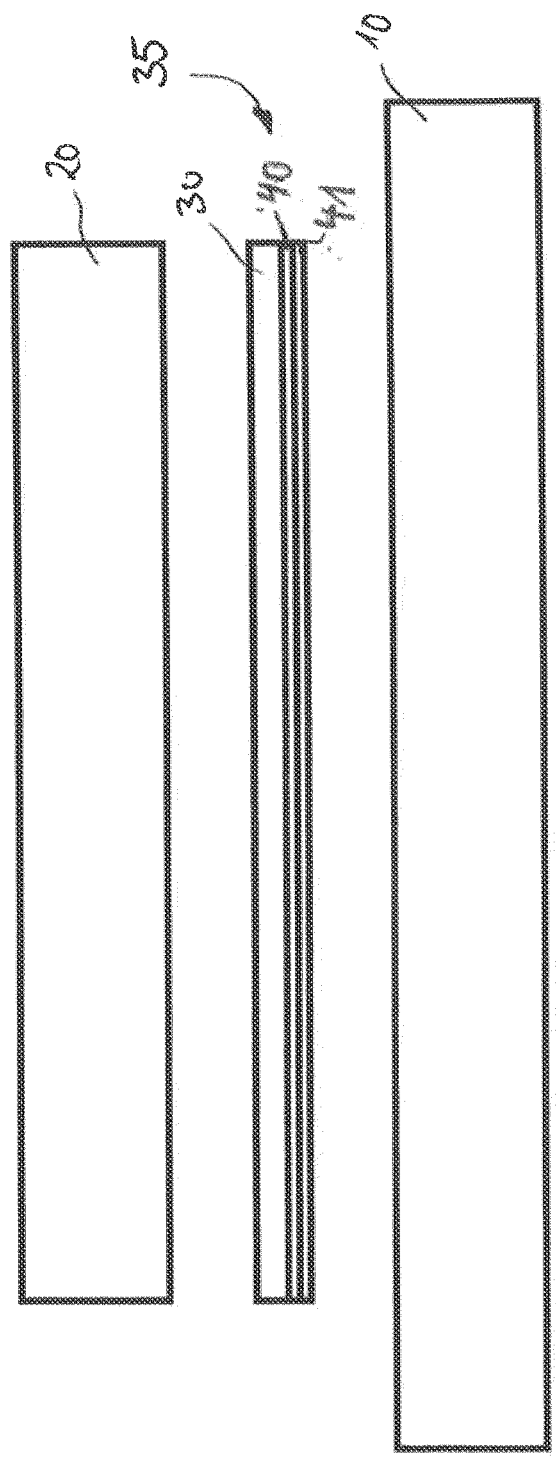
FIG. 3: Schematic of a method for manufacturing a metal-ceramic substrate according to a third preferred embodiment of the present invention.

FIG. 3 schematically illustrates a method for manufacturing a metal-ceramic substrate 1 according to a third exemplary embodiment of the present invention. Essentially, the embodiment differs from that of FIG. 2 in that the at least one active metal layer 40 is attached to the at least one solder layer 30 before being arranged between the at least one metal layer 20 and the at least one ceramic layer 10. In other words, here the bonding of the at least one active metal layer 40 to the at least one solder layer 30 takes place by means of sputtering temporally before the arrangement between the at least one ceramic layer 10 and the at least one metal layer 20. In particular, it is provided that also here at least one protective layer 41 covers the at least one active metal layer 40 partially or preferably completely, in particular on one side, in order to prevent early oxidation of the at least one active metal layer 40.

Figure 4:
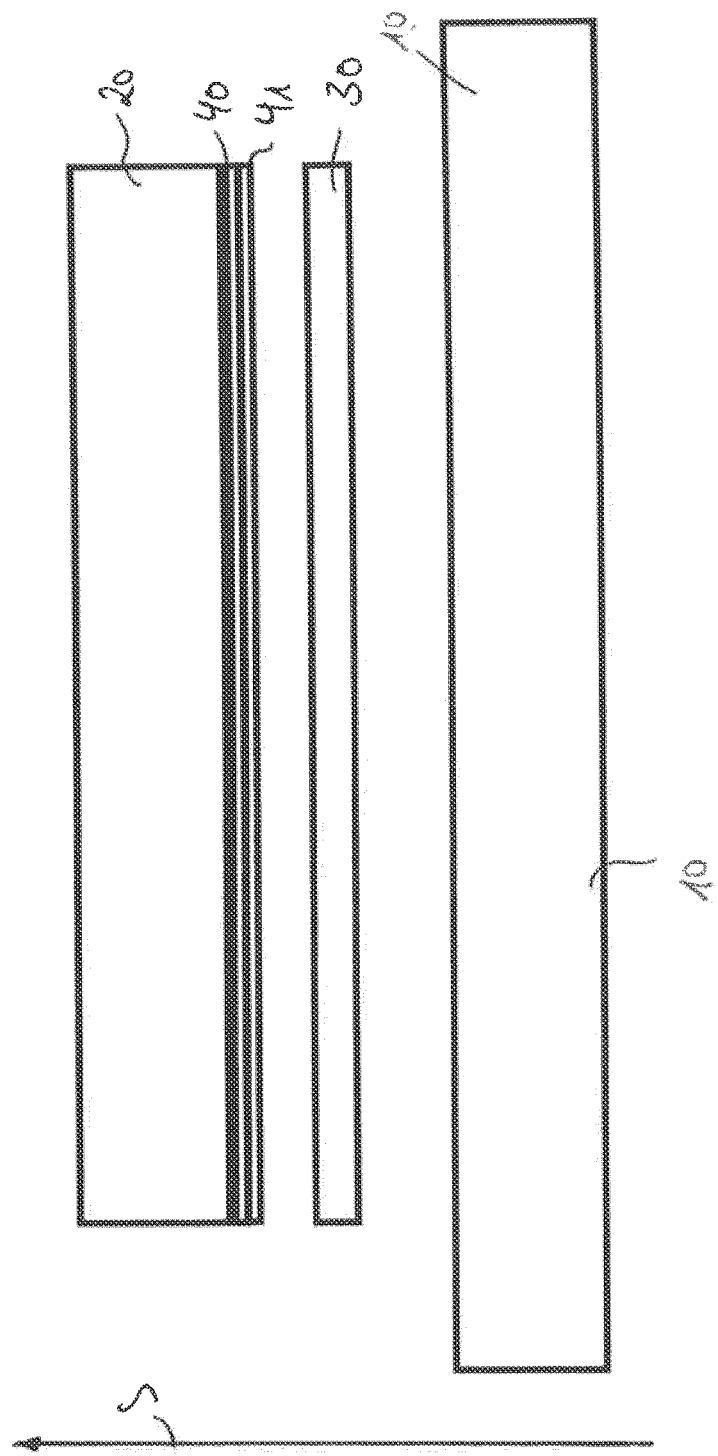
FIG. 4: Schematic of a method for manufacturing a metal-ceramic substrate according to a fourth preferred embodiment of the present invention.

FIG. 4 schematically illustrates a method for manufacturing a metal-ceramic substrate 1 according to a fourth embodiment of the present invention. In contrast to the embodiments of FIGS. 2 and 3, in the embodiment example of FIG. 4 it is provided that the at least one active metal layer 40 is bonded to the at least one metal layer 20 prior to the active solder process. In this case, the at least one active metal layer 40 is arranged in particular on the side of the at least one metal layer 20 facing the solder layer 30 in the bonding process. For example, the at least one active metal layer 40 can be applied to the at least one metal layer 20 over its entire area by means of a CVD process or by sputtering, i.e. generally by means of a vapour deposition process. After arranging the at least one metal layer 20, to which the at least one active metal layer 40 adheres, and the at least one ceramic layer 10, as well as the at least one solder layer 30, the bonding process is carried out by means of an active solder process.

Figure 5:
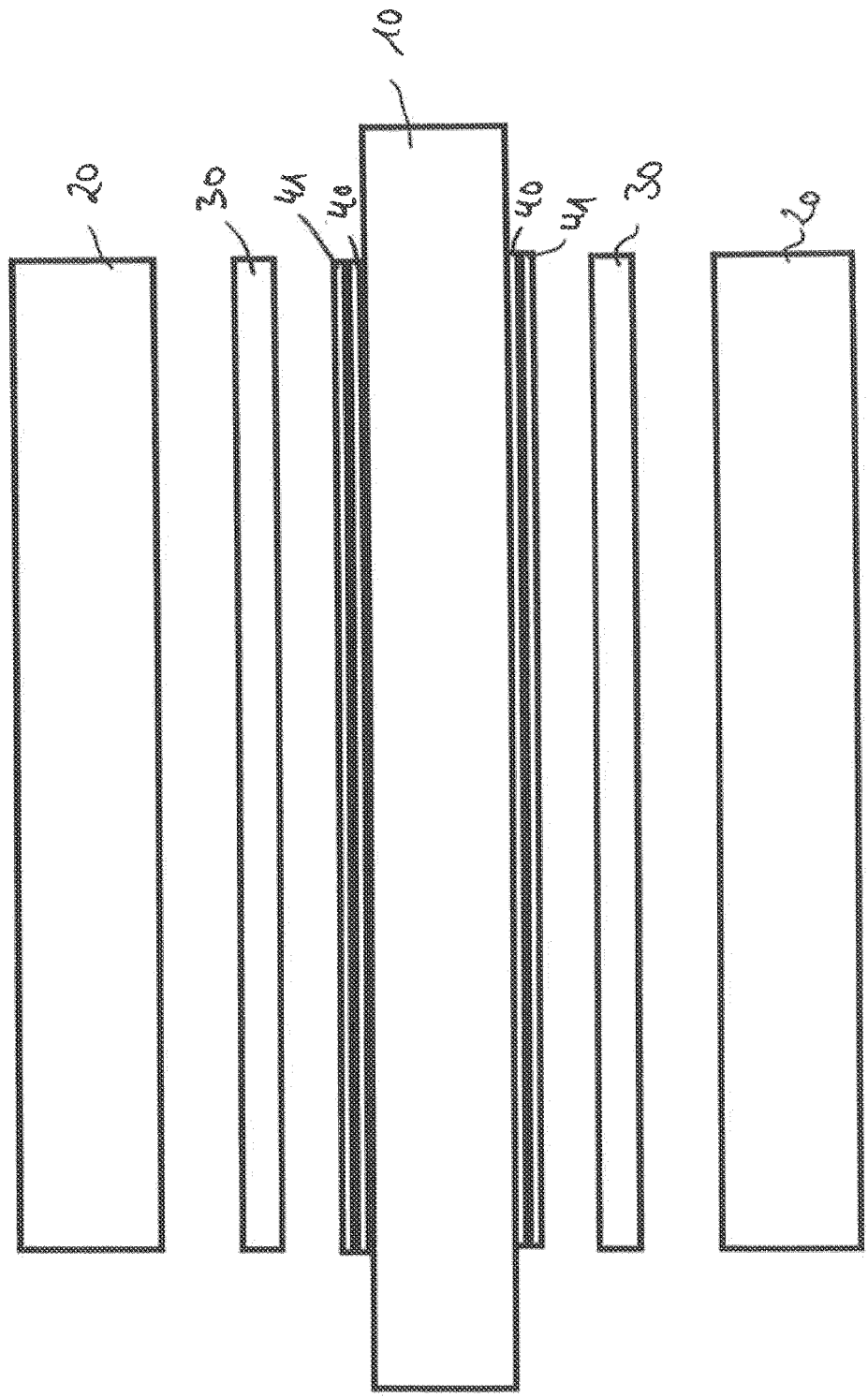
FIG. 5: Schematic of a method for manufacturing a metal-ceramic substrate according to a fifth preferred embodiment of the present invention.

FIG. 5 schematically illustrates a method for manufacturing a metal-ceramic substrate 1 according to a fifth preferred embodiment of the present invention. Here, the embodiment example of FIG. 5 differs from that of FIG. 2 only in that both the front side and the back side of the at least one ceramic layer 10 are each bonded to at least one metal layer 20 via respective solder systems 35, the solder system 35 preferably comprising the at least one solder layer 30, the at least one active metal layer 40 and the at least one protective layer 41.

LIST OF REFERENCE SIGNS

1 Metal ceramic substrate
10 Ceramic layer
20 Metal layer
30 Solder layer
35 Solder system
40 Active metal layer
41 Protective layer
S Stacking direction
HSE Main extension plane
D1 first thickness
D2 second thickness
D3 third thickness

The invention claimed is:

1. A method for manufacturing a metal-ceramic substrate (1), comprising:
 providing at least one ceramic layer (10), at least one metal layer (20) and at least one solder layer (30), wherein the solder layer comprises AgCuIn, AgCuGa, CuIn, CuGa, CuInSn, CuInMb, CuGaSn, CuNi, CuNiMn and/or NiCrMn,
 coating the at least one ceramic layer (10) and/or the at least one metal layer (20) and/or the at least one solder layer (30) with at least one active metal layer (40),
 arranging the at least one solder layer (30) between the at least one ceramic layer (10) and the at least one metal layer (20) along a stacking direction (S), forming a solder system (35) comprising the at least one solder layer and the at least one active metal layer (40), and
 bonding the at least one metal layer (20) to the at least one ceramic layer (10) via the solder system (35) by means of an active solder process,
 wherein the at least one metal layer (20) in a fabricated metal-ceramic substrate (1) is structured to form conductor tracks or connection regions for electrical components, wherein a first thickness (D1) of the at least one active metal layer (40) has a value between 100 nm and 1000 nm, and wherein a ratio of the first thickness (D1) of the at least one active metal layer (40) to a second thickness (D2) of the solder layer (30) has a value between 0.003 and 0.5.

2. The method according to claim 1, wherein a solder material of the at least one solder layer (30) is free of a melting point lowering material and/or is phosphorus-free.

3. The method according to claim 1, wherein the solder layer (30) comprises multiple components and/or is silver-free.

4. The method according to claim 1, wherein
 the active solder process is performed at a pressure of less than $10^{-2}$ mbar and/or
 by using a process gas
 and/or wherein the at least one active metal layer (40) is applied by means of a vapor deposition process and/or galvanically.

5. The method according to claim 1, wherein a second thickness (D2) of the at least one solder layer (30) has a value between 1 μm and 100 μm.

6. The method according to claim 1, wherein the at least one active metal layer (40) changes its composition along the stacking direction (S).

7. The method according to claim 1, wherein the at least one sol-der layer (30) and/or the at least one active metal layer (40) is rolled.

8. The method according to claim 1, wherein a further active metal layer is provided, wherein the solder layer (30) is arranged between the active metal layer (40) and the further active metal layer.

9. The method according to claim 1, wherein the ceramic layer (10) is coated with the active metal layer (40) and the at least one metal layer (20) is coated with the solder layer (30).

10. The method according to claim 1, wherein the at least one metal layer (20) has a layer thickness that is greater than 1 mm.

11. A solder system (35) for a method according to claim 1, wherein the solder system (35) comprises at least one solder layer (30).

12. A metal-ceramic substrate (1) manufactured by a method comprising
 providing at least one ceramic layer (10), at least one metal layer (20) and at least one solder layer (30), wherein the solder layer comprises AgCuIn, AgCuGa, CuIn, CuGa, CuInSn, CuInMb, CuGaSn, CuNi, CuNiMn and/or NiCrMn,
 coating the at least one ceramic layer (10) and/or the at least one metal layer (20) and/or the at least one solder layer (30) with at least one active metal layer (40),
 arranging the at least one solder layer (30) between the at least one ceramic layer (10) and the at least one metal layer (20) along a stacking direction (S), forming a solder system (35) comprising the at least one solder layer and the at least one active metal layer (40), and bonding the at least one metal layer (20) to the at least one ceramic layer (10) via the solder system (35) by means of an active solder process, wherein a first thickness (D1) of the at least one active metal layer (40) has a value between 100 nm and 1000 nm, and wherein a ratio of the first thickness (D1) of the at least one active metal layer (40) to a second thickness (D2) of the solder layer (30) has a value between 0.003 and 0.5.

13. A method for manufacturing a metal-ceramic substrate (1) according to claim 1, wherein the at least one solder layer (30) is in the form of a solder foil.

14. A solder system (35) for a method according to claim 11, wherein the at least one solder layer (30) is in the form of at least one solder foil, and at least one active metal layer (40).

15. A method for manufacturing a metal-ceramic substrate (1), comprising:
   providing at least one ceramic layer (10), at least one metal layer (20) and at least one solder layer (30), wherein the solder layer comprises AgCuIn, AgCuGa, CuIn, CuGa, CuInSn, CuInMb, CuGaSn, CuNi, CuNiMn and/or NiCrMn,
   coating the at least one ceramic layer (10) and/or the at least one metal layer (20) and/or the at least one solder layer (30) with at least one active metal layer (40), wherein the active metal layer is arranged between the solder layer and the ceramic layer,
   arranging the at least one solder layer (30) between the at least one ceramic layer (10) and the at least one metal layer (20) along a stacking direction (S), forming a solder system (35) comprising the at least one solder layer and the at least one active metal layer (40), and
   bonding the at least one metal layer (20) to the at least one ceramic layer (10) via the solder system (35) by means of an active solder process, wherein a first thickness (D1) of the at least one active metal layer (40) has a value between 100 nm and 1000 nm, and wherein a ratio of the first thickness (D1) of the at least one active metal layer (40) to a second thickness (D2) of the solder layer (30) has a value between 0.003 and 0.5.

16. The method according to claim 15, wherein the at least one solder layer (3) is in the form of at least one solder foil.

* * * * *